Aug. 24, 1937.    H. K. FOSTER    2,091,035
CIRCUIT BREAKING DEVICE
Filed Jan. 20, 1936
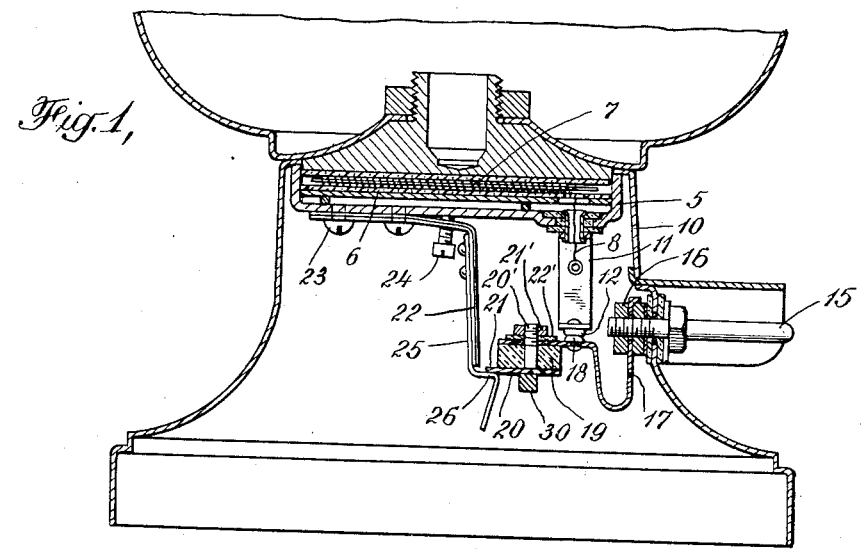
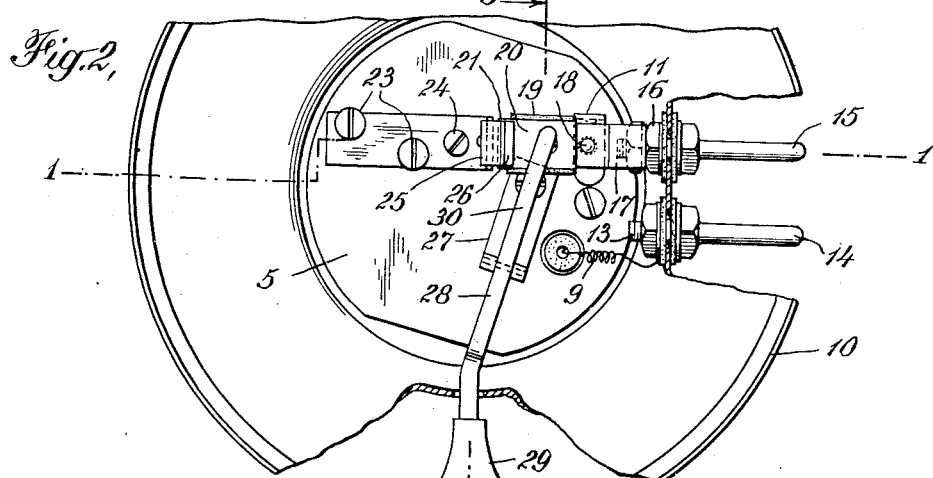
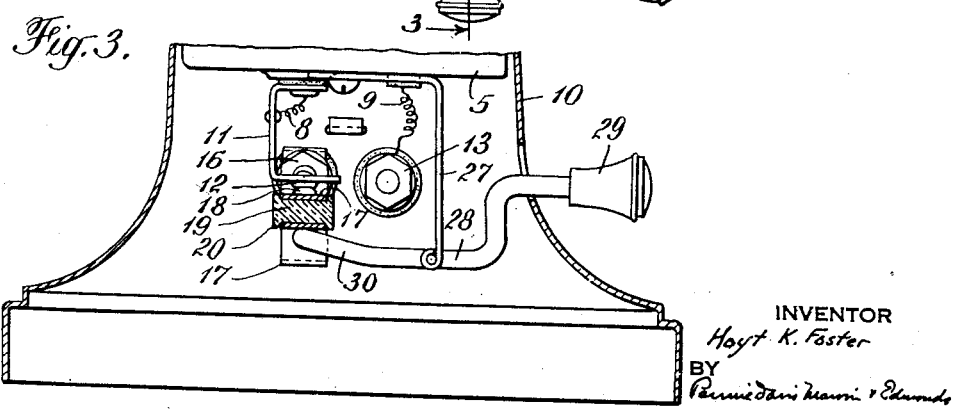
INVENTOR
Hoyt K. Foster
BY
ATTORNEYS Patented Aug. 24, 1937

2,091,035

UNITED STATES PATENT OFFICE 2,091,035

CIRCUIT BREAKING DEVICE

Hoyt K. Foster, Danvers, Mass., assignor to S. W. Farber, Inc., Brooklyn, N. Y., a corporation of New York Application January 20, 1936, Serial No. 59,873

7 Claims. (Cl. 200—139)

This invention relates to circuit-breaking devices adapted particularly for use with electrically heated appliances. The invention is intended especially for use in connection with coffee makers and similar appliances in which water absorbs the heat developed, such as percolators, cookers and the like. It may be employed, however, in connection with any electrically heated appliance wherein it is desirable to break a circuit and thereby to discontinue the current upon the attainment of a predetermined temperature.

Heretofore, certain types of electrically heated appliances have been equipped with fuses adapted to melt on the attainment of a definite temperature, so that the current may be cut off if the appliance is overheated. Such fuses are satisfactory in many instances. They have the disadvantage, however, that the fuse must be replaced after it has melted before the appliance can be used again. Replacement is often a tedious operation which is beyond the skill of the average user. Furthermore, in certain types of appliances such as coffee makers, a fuse cannot be employed satisfactorily. In such apparatus, all of the water is transferred by the application of heat to an upper reservoir, and thereupon the heat must be discontinued. Obviously, if a fuse were used, it would have to be replaced after each successive use of the apparatus.

It is the object of the present invention to provide a simple and effective circuit-breaking device which is actuated whenever the temperature rises above a predetermined maximum and which can be re-set readily by a simple manual operation after the apparatus has cooled somewhat.

Another object of the invention is the provision of a thermostatically controlled circuit-breaking device adapted for use with electric heating appliances.

A further object is the provision of a device of simple construction, economically manufactured with few parts, which is not likely to get out of order and is adapted to satisfactorily perform the functions described.

Other objects and advantages of the invention will be apparent as it is better understood by reference to the following specification and the accompanying drawing, in which Fig. 1 is a vertical section through a portion of an electrically heated coffee maker illustrating the application of the invention thereto;

Fig. 2 is a plan view of the device embodying the invention; and

Fig. 3 is a section on the line 3—3 of Fig. 2.

Referring to the drawing, 5 indicates the housing of an electric heating element comprising the usual resistance wire 6 wound on a suitable support 7 and connected by conductors 8 and 9 to the source of current through means hereinafter described. It will be understood that the form of the housing element is merely representative of such devices as commonly used in electric heating appliances. The particular form illustrated is adapted for use in the coffee maker or percolator, the base of which is indicated at 10.

The conductor 8 is connected to a bracket 11 secured to and insulated from the housing 5 and having a contact 12 thereon. The conductor 9 is connected to a binding post 13 supported in electrically insulated relation to the base 10 which terminates in a projecting prong 14. A corresponding prong 15 is connected to a binding post 16 electrically insulated from the base 10 and supporting a resilient arm 17 having a contact 18 which is adapted to engage the contact 12 when the resilient arm is forced inwardly toward the bracket 11.

An electrical insulating block 19 is supported on the end of the resilient arm 17 and a plate 20 is secured thereto with a projecting lip 21. The plate 20 is electrically insulated from the resilient arm 17 by the block 19 which projects into the opening which receives the screw 20'. A nut 21' and insulating washer 22' secure the screw.

A bracket 22, of heat-sensitive metal, usually designated "bimetal" and consisting of two strips of metals having different coefficients of expansion rigidly secured together, is mounted on the housing 5, being fastened thereto with screws 23. A screw 24 is mounted in the bracket and engages the housing 5 to afford a degree of adjustment. A strip of ordinary resilient metal such as steel 25 having a catch 26 at the end thereof is secured to the bracket 22 and is adapted to engage the lip 21 thereby holding the resilient arm 17 in position to complete the circuit through the contacts 12 and 18. When the device is to be reset, the bimetal element is normally cold (at room temperature) and has resumed its normal position as before heating. The strip 25 then takes the bending stress thereby relieving the bimetal of any strains which might tend to modify its position and the operation of the device.

The bracket of bimetal is adapted to flex under the influence of heat, and as the temperature rises, and particularly when the appliance is overheated, the bimetal will flex sufficiently so as to release the catch 26 from the lip 21 when a predetermined temperature is attained. When the lip is released, the resilient arm moves away from the bracket supporting the contact 12, and the circuit is thereby broken. This affords a quick break at the contact points and reduces arcing when the circuit is broken.

To facilitate resetting, a bracket 27 is supported on the housing 5 and carries a pivoted lever 28 having a handle 29 and a free end 30 which is adapted to engage the plate 20. By actuating the lever, the lip 21 may be forced under the catch with the contacts again in engagement.

From the foregoing description, it will be evident that the circuit may be broken automatically and in such a way as to avoid excessive arcing whenever the temperature of the appliance reaches a predetermined point.

Thus, in the coffee maker to which the device is applied by way of illustration, the transferrence of the water to the upper reservoir results immediately in an increase of temperature at the base of the machine because the water is no longer present to absorb the heat. When this condition arises, the flow of current is automatically cut off before any damage can result to the heating element. The device may, however, be reset by simply operating the lever, and is again ready for use. Obviously the circuit-breaking device may replace the fuse in any type of electrically heated appliance.

Various changes may be made in the details of construction and arrangement of the parts without departing from the invention or sacrificing the advantages thereof. It is intended that all matter contained in the above description or shown in the accompanying drawing shall be interpreted as illustrative and not in a limiting sense. I desire, therefore, that only such limitations shall be placed thereon as are imposed by the prior art.

I claim:

1. In a circuit breaking device for electrically heated appliances, a fixed contact, a resiliently biased arm having a co-operating contact, a heat-sensitive, bimetallic bracket adapted to flex when the temperature rises, and a resilient detent secured to one arm of the bracket and adapted to engage the arm to hold the contacts in engagement.

2. In a circuit breaking device for electrically heated appliances, a fixed contact, a resiliently biased arm having a co-operating contact, a heat-sensitive, bimetallic bracket adapted to flex when the temperature rises, a resilient detent secured to one arm of the bracket and adapted to engage the arm to hold the contacts in engagement, and manually operable means to engage the arm with the detent.

3. In a circuit breaking device for electrically heated appliances, a fixed contact, a resiliently biased arm having a co-operating contact, a bracket of heat sensitive metal adapted to flex when the temperature rises, a resilient detent secured to one arm of the bracket and adapted to engage the arm to hold the contacts in engagement, a pivoted lever, one end being adapted to engages the resiliently biased arm and means at the other end to facilitate manual operation of the lever.

4. In a circuit breaking device for electrically heated appliances, contacts, heat-sensitive means, a resilient detent supported on the heat sensitive means and adapted to hold the contacts in engagement, the heat sensitive means being adapted to move the detent and to permit separation of the contacts when a predetermined temperature is attained, and means for resetting the detent, the resilience thereof permitting movement independently of the heat sensitive means.

5. In a circuit-breaking device for electrically heated appliances, a fixed contact, an arm having a fixed portion and a movable portion, said movable portion of the arm having a cooperating contact, the movable portion of said arm being of resilient material biased by the inherent elasticity thereof to move the cooperating contact away from the fixed contact by leverage action due to the movable portion of the arm fulcruming about the fixed portion thereof, a detent adapted to engage the arm to hold the cooperating contact in electrical contact with the fixed contact, and heat-sensitive means movable at predetermined temperature to disengage the detent from the arm to permit separation of said contacts by said leverage action.

6. In a circuit-breaking device for electrically heated appliances, a fixed contact, an arm having a fixed portion and a movable portion, said movable portion of the arm having a cooperating contact, the movable portion of said arm being of resilient material biased by the inherent elasticity thereof to move the cooperating contact away from the fixed contact by leverage action due to the movable portion of the arm fulcruming about the fixed portion thereof, a detent adapted to engage the arm to hold the cooperating contact in electrical contact with the fixed contact, heat-sensitive means movable at predetermined temperature to disengage the detent from the arm to permit separation of said contacts by said leverage action, and manually operable means to engage the movable portion of the arm with the detent.

7. In a circuit-breaking device for electrically heated appliances, a fixed contact, a resiliently biased arm having a cooperating contact, a heat-sensitive bimetallic bracket adapted to flex when the temperature rises, a spring detent secured to one arm of the bracket and adapted to engage the arm to hold the contacts in engagement, and manually-operable means to engage the arm with the detent.

HOYT K. FOSTER.